United States Patent [19]

Braun

[11] 4,348,669
[45] Sep. 7, 1982

[54] LOAD ENERGIZING AND DE-ENERGIZING CONTROL SYSTEM AND METHOD

[76] Inventor: Dudley E. Braun, 1700 Lynngrove Dr., Manhattan Beach, Calif. 90266

[21] Appl. No.: 146,886

[22] Filed: May 5, 1980

[51] Int. Cl.$^3$ ............................................. H04Q 9/00
[52] U.S. Cl. ........................... 340/825.58; 340/168 R; 340/825.68; 340/825.71; 179/2 A
[58] Field of Search .......... 340/171 A, 171 R, 168 R, 340/168 B, 147 C, 147 R, 825.03, 825.58, 825.68, 825.71, 825.76, 168 S; 179/2 A

[56] References Cited

U.S. PATENT DOCUMENTS

| | | | |
|---|---|---|---|
| 3,882,545 | 5/1975 | Titus | 340/171 A |
| 4,056,808 | 11/1977 | Benhamov | 340/171 R |
| 4,167,786 | 9/1979 | Miller | 340/150 |
| 4,185,272 | 1/1980 | Feiker | 340/310 R |
| 4,214,229 | 7/1980 | Warner | 340/171 R |
| 4,232,231 | 11/1980 | Reed | 340/147 R |
| 4,245,347 | 1/1981 | Hutton et al. | 340/167 A |

*Primary Examiner*—Donald J. Yusko
*Attorney, Agent, or Firm*—Nilsson, Robbins, Dalgarn, Berliner, Carson & Wurst

[57] ABSTRACT

A system operates to control the energizing and deenergizing of energy-utilizing loads at facilities remote from each other. A transmitter, remote from each of the facilities, transmits signals carrying a plurality of time multiplexed channels of information to a communication and control terminal at each of the facilities. The communication and control terminal, in response, generates time-multiplexed signals, representative of the information in such channels. The time-multiplexed channel information in the generated signals is stored in a shift register, one bit per channel; and a channel selector for each of a number of load networks in a facility, couples a bit in the shift register to a relay control. The relay control controls a switch which, in response to the selected channel, couples electrical power to and decouples such power from the associated network. Other channels or the same channel, in analogous fashion, can be coupled to other load networks at each facility. A method of controlling the energizing and de-energizing of energy-utilizing loads at facilities remote from each other is in accordance with the indicated control system.

18 Claims, 16 Drawing Figures

LOAD ENERGIZING AND DE-ENERGIZING CONTROL SYSTEM AND METHOD

FIELD OF THE INVENTION

This invention pertains to systems for controlling load energizing and de-energizing at facilities remote from one another by remote central control, and the methods of operation of such systems.

BACKGROUND OF THE INVENTION

As energy becomes more expensive, work has accelerated on the development of systems and methods to improve the efficiency of utilization of energy. In this connection, various attempts have been made to design systems to control energy utilization at geographically distinct facilities from a single control facility. A typical implementation of this sort, among other possible capabilities, includes the centralized control of the energizing of energy-utilizing devices at the various facilities.

Typically, such implementations, e.g., call for a station at an energy-utilizing facility to receive only one of a number of frequencies, so as to be independently addressable from the central facility, such as in Stevenson U.S. Pat. No. 4,023,043. Perhaps even more commonly, the independent addressing capability is provided by digitally coding an address to which only one or a group of stations (or controls) is responsive, as in Pai U.S. Pat. No. 4,130,874, Miller et al U.S. Pat. No. 4,167,786, Wu U.S. Pat. No. 4,163,218 and Bogacki U.S. Pat. No. 4,161,720.

The digital coding, as indicated among these patents, may well be grounded in frequency (the presence of a given frequency being high and its absence being low, or one frequency being high and another frequency being low), with, for example, one or more stations only receptive to a code of codes grounded in a certain frequency or frequencies. This is well illustrated in Bogacki, supra.

The dependence of addressing upon the frequency of the output from the central facility or upon an encoded address generated and transmitted by the central facility typically results in complicated and expensive components and designs at both the transmitting end and at the receiving end.

This is well illustrated by all of the above patents, apart from Stevenson which is presented more generally than others.

Such expense, along with, commonly, tailored design requirements for each remote station or for each of several groups, substantially decreases the economic viability of the general concept.

The present invention addresses the concept of the remote control of energy utilization at remote facilities in a way which provides not only simplicity of design, but simplicity of operation. Such is accomplished through apparatus which transmits a plurality of channels of information which are all received and operated on at each of the remote facilities. Apparatus which transmits time-multiplexed channels and, in each terminal, which responds to, operates on and stores the information in such channels, provides for ready channel selection, to control load networks at the facility associated with the terminal.

SUMMARY OF THE INVENTION

In accordance with the invention, a system for controlling the energizing and de-energizing of energy-utilizing loads at facilities remote from each other, includes: a transmitter, remote from each of the facilities, for generating and transmitting signals carrying a plurality of channels of information for controlling the energizing and de-energizing of loads at the facilities; and a communication and control terminal at each of the remote facilities. Such terminal includes: receiving and generating means for receiving the transmitted signals and for generating signals, carrying the plurality of channels of information, representative of the transmitted signals; channel-selection means, operatively coupled to the receiving and generating means, for selecting one of the channels carried by the generated signals to control the energizing and de-energizing of a load at the facility; and switching means, operatively coupled to the selection means and to the load, for receiving the selected channel of information and for electrically coupling the load to an energy source and electrically decoupling the load from the energy source, in response to the selected channel of information.

The channels carried by the transmitted signals, e.g., may be time-multiplexed channels with the receiving and generating means, in each of the terminals, including means for generating time-multiplexed signals carrying such channels of information in response to the transmitted signals. Then, the terminal at each of the remote facilities may further include a storage means, e.g., comprising a shift register, for receiving the generated time-multiplexed signals and for storing sets of digital signals representative of the generated signals. Still further, the switching means in each of the terminals may then be operatively coupled to couple and decouple the load in response to one bit only of information in the shift register.

A method of controlling the energizing and de-energizing of energy-utilizing loads at facilities remote from each other, is in accordance with the above system.

DETAILED DESCRIPTION

Figure 1:
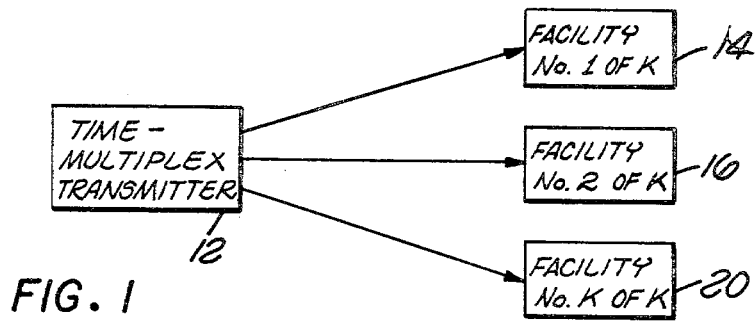
FIG. 1 is a diagrammatic view of a transmitter and a number of facilities with which it communicates in accordance with the invention.

In FIG. 1, a time multiplex transmitter, i.e., a transmitter which transmits time-multiplexed signals, is shown in a way indicative of its communication link with three of "K" energy-utilizing facilities. Such facilities may be of various kinds, including, by way of example, residences, schools, business establishments, office buildings, etc. These facilities, however, are all of a type which employ devices which function as interruptable loads on energy sources. Examples of such devices are heating systems, air conditioners, individual lights or groups of lights, various applicances, etc. As indicated by FIG. 1, each facility is geographically distinct from the other facilities and from the transmitter. Only three of the facilities, facility no. 1 14, facility no. 2 16 and facility no. K 20 (K being a number that is three or greater) are shown in FIG. 1.

Figure 2:
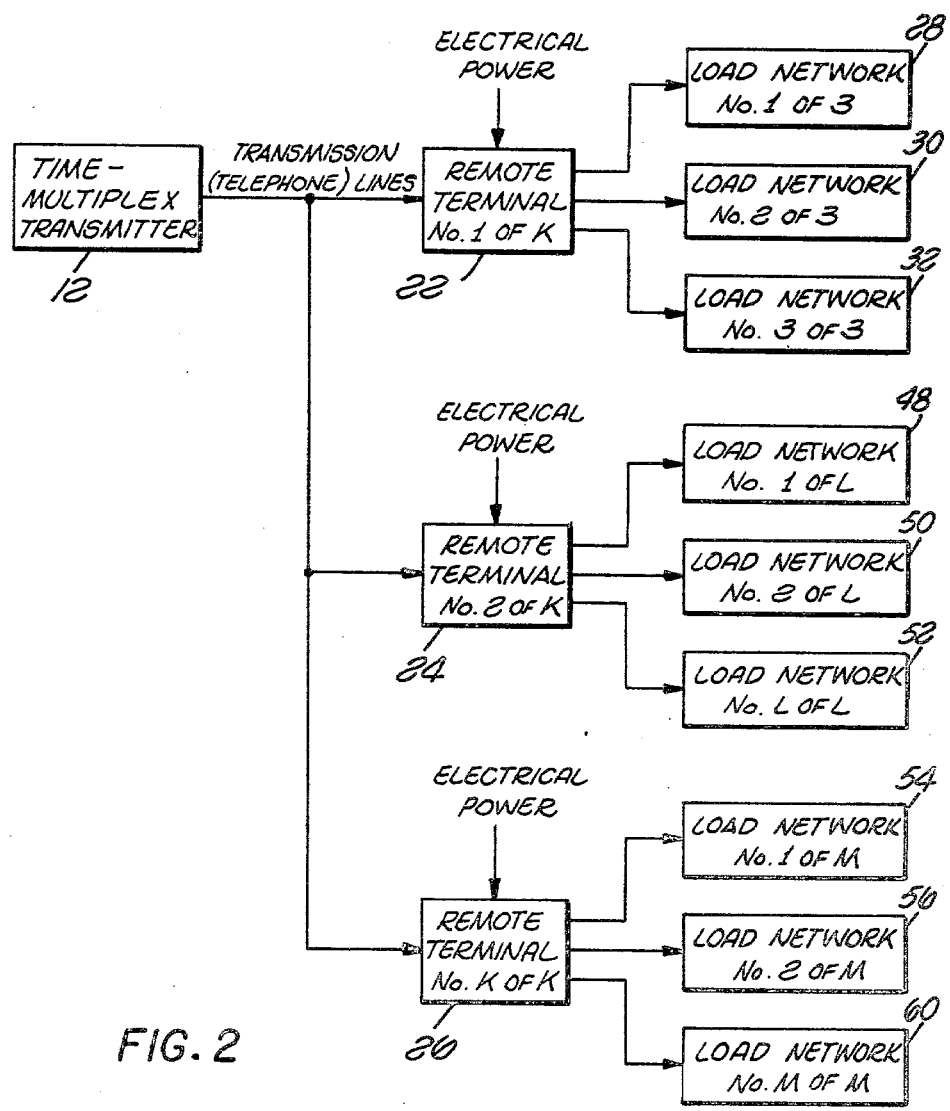
FIG. 2 is a diagrammatic view showing the transmitter, remote terminals in each facility, and load networks in each facility, in additional detail.
Figure 3:
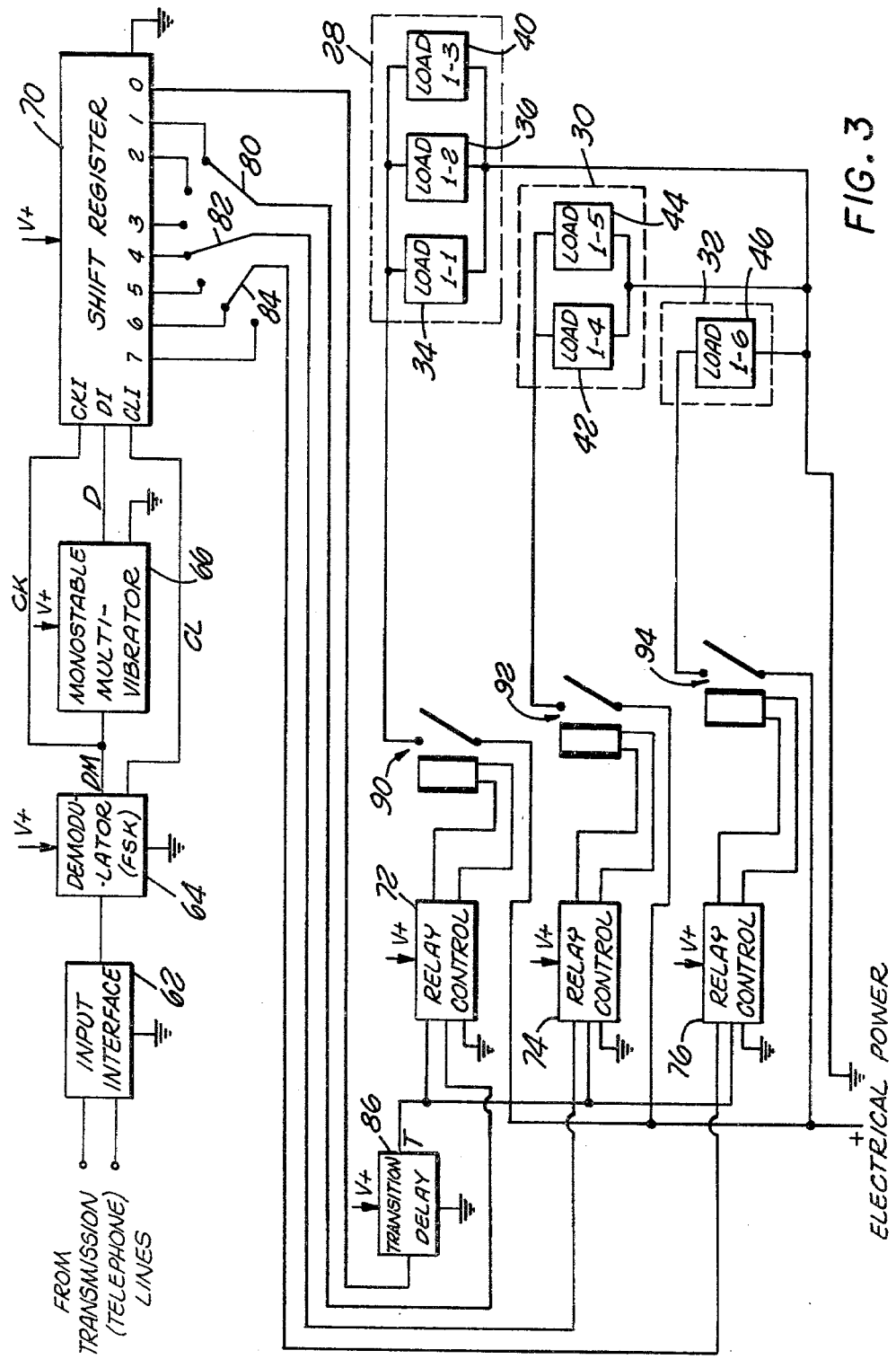
FIG. 3 is a block-schematic diagram showing, by way of example, remote terminal no. 1 of FIG. 2, and the associated load networks, in additional detail.

Although the matters of concern herein have applicability to a wide range of energy sources for the loads, in the particular case illustrated in FIG. 1, as more fully indicated in FIGS. 2 and 3, power is supplied to at least some of the loads in each of the facilities through electricity. This would typically be electrical power through power lines of one electrical utility system supplying the facilities. In FIG. 2, wherein remote terminal no. 1 22, which is at facility no. 1, remote terminal no. 2 24, which is at facility no. 2, and remote terminal no. K 26, which is at facility no. K, are shown, it is indicated that there is one remote terminal at each of the facilities.

As further indicated in FIG. 2, each of the remote terminals is operatively connected to a number of load networks to control the energizing and de-energizing of such load networks by the electrical power.

Summarily, the time-multiplex transmitter transmits signals which are received by each of the remote terminals, and which are operated upon by each of the terminal to, ultimately, act to control the energizing and de-energizing of load networks associated with the remote terminal. By way of example, the three load networks, load network no. 1 28, load network no. 2 30, and load network no. 3 32, associated with remote terminal no. 1, are shown in more detail in FIG. 3.

As shown therein, load network no. 1 of these three includes first, second and third loads 34, 36 and 40, respectively, associated with remote terminal no. 1; load network no. 2 associated with remote terminal no. 1 includes fourth and fifth loads 42 and 44, respectively, associated with such terminal; and load network no. 3 associated with remote terminal no. 1 includes just a sixth load 46 associated with such terminal.

It should be evident that the number of networks and loads per network for remote terminal no. 1 are merely exemplary. The number of relay controls, relays and other elements of FIG. 3 dependent thereon, is then also exemplary, due to their dependence on the number of load networks. However, the remainder of the remote terminal of FIG. 3 would be essentially identically present in each of the remote terminals. As is rather readily apparent in FIG. 3, ultimately, a single bit in a serial-input/parallel-output shift register, which may periodically change and be periodically read in response to the time-multiplexed transmitted signals, determines whether a network may be energized or de-energized.

It should be noted, at this point, that each load in a load-network may in fact include a switch or other mechanism to independently decouple the energy-utilizing element or component in the load from the electrical power source. Therefore, the concept of energizing and de-energizing herein, from the transmitter 12, incorporates the concept of independent means as part of and included in the "load" to potentially block the utilization of energy by a load independently of the control exercised from the transmitter.

Alternatively, of course, one or more loads may not include such an independent decoupling mechanism. In this case, the actual utilization of energy by the load would be directly controlled by the transmitter and the remote terminal associated with the load.

Now returning to FIG. 2, still in generally illustrative fashion, load networks numbering the variable "L" (a variable that is three or greater) are associated with remote terminal no. 2 24. Thus, there are load networks no. 1 of L 48, no. 2 of L 50 and no. L of L 52, associated with remote terminal no. 2, specifically shown in FIG. 2.

Similarly, still in illustrative fashion, it is indicated that there are in fact the variable "K" remote terminals; and the Kth of these is shown in FIG. 2, with three of "M" load networks associated therewith (M being a variable that is three or greater). Thus, load network no. 1 of M 54, load network no. 2 of M 56 and load network no. M of M 60 are shown.

Now referring again to FIG. 3, and specifically to remote terminal no. 1 22, the time-multiplexed transmitter signals are received by the terminal at an input interface 62 and demodulated by a demodulator 64. The demodulated signals generated by the demodulator in response to the transmitted signals are used as triggering signals for a monostable multivibrator 66 and for a shift register 70. The demodulated signals cause related output signals from the monostable multivibrator, which act as input data signals to the shift register 70. The demodulated signals carry, for the specific system herein, seven time-multiplexed channels of information from the transmitted signals.

The information for such channels is serially read into the shift register 70 and stored as seven bits. The zeroth bit of the shift register, which is not used for one of the data channels, is employed to, upon the receipt by it of a high signal, trigger a first network relay control 72, a second network relay control 74 and a third network relay control 76. The first network relay control 72 is coupled to the first storage bit of the shift register, and thus to the first channel of information, by a first network rotary switch 80. Similarly, the second network relay control 74 is coupled to the fourth storage bit of the shift register 70, and thus to the fourth channel of information, by a second network rotary switch 82; and the third network relay control 76 is coupled to the sixth storage bit of the shift register, and thus to the sixth channel of information, by a third network rotary switch 84.

It should be apparent by reference to FIG. 3, that the coupling of each relay control can be to any of the seven channels, and such coupling may readily be changed, solely by adjustment of the rotary switch at the remote terminal. It should similarly be apparent that the number of channels is exemplary, and, along with the number of bits of the shift register, can readily be varied. Also, for example, two or more relay controls could readily be coupled to the same channel. This provides excellent flexibility at the remote terminal, which flexibility is accomplished in a fashion which desirably avoids complications typically attendant to prior systems.

Now the operation of the apparatus of FIG. 3 will be described in more detail, in connection with the illustrative timing signals of FIG. 4. Initially, it should be noted that the particular transmission vehicle for the system of FIG. 1, and thus the input vehicle to the apparatus of FIG. 3, is transmission lines, and in particular telephone lines. In addition, the signals generated and transmitted by the time multiplex transmitter 12, over such telephone lines, are, in the particular embodiment, tone modulated signals. Thus, in the particular embodiment, a higher frequency signal, e.g., in the range of 2200 hertz is representative of a digital "low" and a lower frequency signal, e.g., in the range of 1200 hertz is representative of a digital "high". (It should be apparent that these frequencies are exemplary and any pair of frequencies suitable for the transmission line could be readily used.) This is indicated in FIG. 4(a) wherein the frequency of an exemplary transmitted signal, containing seven time-multiplexed channels, is shown. The lowest level, along such signal, is representative of no signal over the telephone lines.

In addition, along such signal, the occurrence of a rising edge of a logic high (low frequency) a "short" interval after a logic low (high frequency) begins and within the timing period of the monostable multivibrator 66, represents a high for a time-multiplexed channel, while the occurrence of a rising edge of a logic high a "long" interval after a logic low begins and after the timing period of the multivibrator has ended, represents a low for a time-multiplexed channel. Therefore, in accordance with this, the transmitted seven-channel signal of FIG. 4(a) contains a zero (low) in the first, second, third and seventh channels, and a one (high) in the fourth, fifth and sixth channels. The zeroth channel is always transmitted with a one therein. As will be explained in more detail below, this one becomes a triggering bit, in the zeroth storage bit of the shift register 70, for the relay controls.

The input interface 62 is conventionally implemented. Thus, it includes a lightening surge limiter (cathode to cathode zener diodes shunted across the telephone lines) and an isolation transformer (ungrounded primary coil shunted across telephone lines and secondary coil grounded at one side) and a series input capacitor (between the side of the secondary coil that is not grounded and the input of the demodulator 64). The lightening surge limiter is to restrict the voltage across the telephone lines, e.g., in the event of a lightening strike or other such instability-inducing stimulus. The isolation transformer, in conventional fashion, protects the telephone lines against any D.C. voltage which might otherwise back up into the lines from circuitry on the other side of the transformer. The capacitor, in conventional fashion, provides A.C. coupling to the input of the demodulator. The above should be well known to those skilled in the art and, it will be apparent to those skilled in the art, that other implementations of the indicated functions could readily be substituted.

The demodulator 64, a standard frequency shift key demodulator, provides a high output along the demodulated signal DM, in response to the lower frequency, and a low signal, in response to the higher frequency. This is illustrated in FIG. 4(c). The demodulator 64 also provides a clear signal CL responsive to the presence and absence of an input signal to the demodulator from the input interface 62. The demodulator 64 is also implemented in conventional fashion. In the preferred embodiment, the implementation is with an integrated circuit demodulator chip made by EXAR and sold under the designation XR2211, along with associated components (capacitors and resistors) coupled to the chip in standard fashion.

From the demodulator 64, the demodulated signal DM provides the input to the re-triggerable monostable multivibrator 66. The illustrative output signal D from the multivibrator, resulting from the triggering of the multivibrator by the falling edges of the demodulated signal of FIG. 4(c), is shown in FIG. 4(d). The output signal from the multivibrator is provided to the serial data input DI of the serial-input/parallel-output shift register. The demodulated signal DM, apart from providing the input to the multivibrator, also provides the clocking signal CK to the clocking input CKI of the shift register 70. Thus, the shift register enters a high or low in its first register stage (which is the seventh parallel output as shown in FIG. 3) in response to a high or low, respectively, along the multivibrator output signal D, clocked by a rising edge of the clocking signal CK (which is also the demodulated signal DM). This is illustrated in FIG. 4(e).

Figure 4:
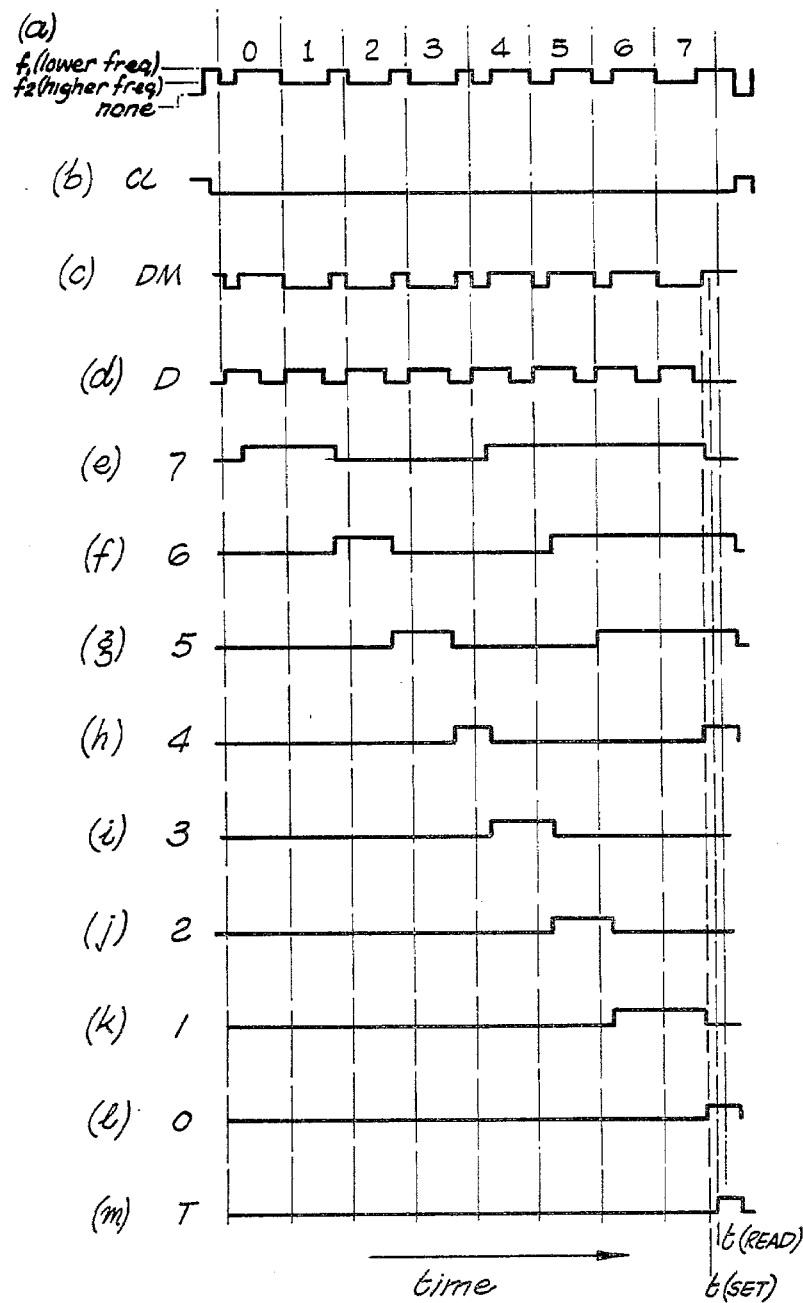
FIGS. 4(a)–4(m) are timing diagrams for illustrating, by way of example, the operation of remote terminal no. 1 of FIGS. 2 and 3.

Still referring to the illustrative signals of FIG. 4, it should be apparent that the multivibrator output signal D and clocking signal CK to the shift register, in conventional fashion, continue to read serial data into the shift register until each of the parallel output bits of the shift register contains a high or low, the outputs 1–7 then containing the information in channels 1–7, one bit per channel.

This situation is represented in FIG. 4 when the zeroth storage bit of the shift register goes high at time t(set). This bit, representative of the high for the initial interval of the transmitted signal, is used after a short delay as a triggering bit for the relay controls along the rising edge thereof. Thus, the seven channels of information are always preceded by a high for triggering. As previously noted, this may conveniently be viewed as a zeroth channel of information.

The triggering of the relay controls 72, 74 and 76 occurs (at time t(read) in FIG. 4) along a triggering signal T, which follows, with a short delay, the rising edge of the zeroth shift register bit, to allow the shift register to become stable before being read. The relay controls and rising edge delay are implemented in conventional fashion. More particularly, the delay function is accomplished with a voltage phase lag RC circuit (resistor in series followed by capacitor in parallel).

Upon the transition to high of the triggering signal T, each of the relay controls, in response to the information in the selected storage bit of the shift register for the control, controls a relay. Therefore, there is a first network relay 90 coupled to the first network relay control 72, a second network relay 92 coupled to the second network relay control 74, and a third network relay 94 coupled to the third network relay control 76. Upon the triggering of the associated relay control, each of the switches in each of the relays becomes or remains open in response to a low in the associated, selected bit of the shift register, and remains or becomes closed, in response to a high in such storage bit. In this fashion, the energizing and de-energizing of each load network, and thus, of each load in the network, can be controlled from the transmitter by way of a channel selection in the remote terminal. Then, by transmitting complete information for all of the seven channels successively, the control is achieved over time. Although a high rate of control will typically be unnecessary, in the range of up to about 1500 pulses (each indicative of a high or low level for a channel) per second could readily be employed. More typically, however, a rate of 100 per second or less would be employed.

Referring again to FIG. 4, the clear signal CL from the demodulator 64, indicative of the presence or absence of an input from the telephone lines to the remote terminal, is employed to signal to the shift register 70, that the terminal is about to receive initial, revised or refreshed information for the channels. Thus, in the event transmission has been occurring just before new information to control the relays is to be transmitted, transmission ceases for a short period to send the clear signal high. The clear signal then becomes low again just prior to when the transmission of the information to control the relays recommences. The rising edge of the clear signal, such clear signal being provided to the clear input CI of the shift register, then clears the shift register of the prior channel information therein, which is to be updated. Clearing the shift register, of course, does not affect the relays because they are latched by the relay controls.

Now referring again to the relay controls and relays, the relay controls are each conventionally implemented using a D-type flip-flop, with the selected shift register storage bit providing the input, and the triggering signal from the transition delay 86 providing the clock. The output of the flip-flop is then directly provided to the base of an NPN transistor having an emitter follower resistor between the emitter and ground, and a protection diode between the collector and the bias voltage. This arrangement of course is a conventional current amplifier. The protection diode is shunted across the relay coil to protect the transistor (with the anode of the diode connected to the collector of the transistor). It, however, should be evident that this is one conventional implementation of many that could be employed for the relay controls. An integrated circuit chip sold under the designation 4013 has been found satisfactory in implementing the D-flip-flop noted above. In a similar vein, an integrated circuit chip sold under the general designation 4015 has been found to be satisfactory for implementation of the shift register 70, and an integrated circuit chip sold under the general designation 4528 has been found satisfactory for implementation of the monostable multivibrator 66.

By reference to FIG. 4, it should be evident that in the remote terminal, the demodulated signal DM, containing the seven channels of information, as with the transmitted signal, is time-multiplexed, with each channel asssigned a specific temporal location. This, along with the storage of the information in each channel in a single storage bit of the shift register, is of great significance in achieving the simplicity of design and operation.

The time-multiplex transmitter 12 shown in FIGS. 1 and 2 may be readily implemented in conventional fashion. For example, for remote terminals employing the EXAR XR2211 tone demodulator, a transmitter employing a matching EXAR XR 2206 tone modulator may conveniently be employed. Such tone modulator may be conventionally employed to provide the higher frequency tone upon receipt of a digital high signal and the lower frequency tone upon the receipt of a digital low signal, along with no tone output when a separate digital signal turns the modulator off. Other transmitters and transmission vehicles could be used in connection with appropriate variations in the embodiment described herein, for example, along general lines, a transmitter which sends a modulated radio frequency carrier through the atmosphere or over power utility lines.

It is again noted that the particular embodiment described herein is illustrative of the invention, and that many changes and modifications in the particular embodiment may be made without departing from the spirit and scope of the invention.

What is claimed is:

1. A system for controlling the energizing and de-energizing of energy-utilizing loads at facilities remote from each other, comprising:
   (a) a transmitter, remote from each of the facilities, for generating and transmitting successive signal groups carrying a plurality of channels of information for controlling the energizing and de-energizing of a plurality of loads at each of the facilities, each of said signal groups carrying said plurality of channels of information;
   (b) a communication and control terminal at each of the remote facilities adapted for controlling the energizing and de-energizing of said plurality of loads at the facility in response to each of said same successive signal groups as the other of the facilities, including,
      (1) receiving and generating means for receiving each of said transmitted successive signal groups and for generating successive signal groups, carrying said plurality of channels of information, representative of said transmitted successive signal groups, each of said generated signal groups carrying said plurality of channels of information;
      (2) channel-selection means for said plurality of loads at the facility, operatively coupled to said receiving and generating means, for selecting one of said channels carried by said generated successive signal groups to control the energizing and de-energizing of each of said plurality of loads at the facility, and
      (3) switching means for said plurality of loads at the facility, operatively coupled to said selection means and to said plurality of loads, for receiving said channel of information selected for each of said loads and for electrically coupling said load to an energy source and electrically decoupling said load from the energy source, in response to said selected channel of information.

2. A load energizing and de-energizing control system as defined in claim 1 wherein said channels of information carried by said transmitted successive signal groups are time-multiplexed and wherein said receiving and generating means at each of said terminals includes:
   means for generating successive signal groups which are time-multiplexed signals carrying said channels of information in response to said transmitted successive signal groups.

3. A load energizing and de-energizing control system as defined in claim 2 wherein said terminal at each of the remote facilities further includes:
   storage means for successively receiving said generated successive groups of time-multiplexed signals and for successively storing sets of digital signals representative of said successive groups of generated signals.

4. A load energizing and de-energizing control system as defined in claim 3 wherein said storage means in each of said terminals includes a shift register.

5. A load energizing and de-energizing control system as defined in claim 4 wherein said switching means in each of said terminals is operatively coupled to couple and decouple each of said plurality of loads in response to one bit only of information in said shift register.

6. A load energizing and de-energizing control system as defined in claim 3 wherein said switching means in each of said terminals is operatively coupled to couple and decouple each of said plurality of loads in response to one bit only of said stored signals.

7. A load energizing and de-energizing system as defined in claim 1 wherein said channel-selection means in each of said terminals includes means for changing said channel selection for each of said plurality of loads.

8. A method of controlling the energizing and de-energizing of energy-utilizing loads at facilities remote from each other, comprising the steps of:
   (a) generating and transmitting successive signal groups carrying a plurality of channels of information for controlling the energizing and de-energizing of a plurality of loads at each of the facilities, said generating being at, and said transmitting being from, a location which is remote from each of the facilities, each of said signal groups carrying said plurality of channels of information;
   (b) receiving each of said transmitted successive signal groups at each remote facility;
   (c) generating, at each remote facility, successive signal groups, carrying said plurality of channels of information, representative of said transmitted successive signal groups, each of said generated signal groups carrying said plurality of channels of information;
   (d) selecting, at each remote facility, one of said channels of information carried by said generated successive signal groups to control the energizing and de-energizing of each of said plurality of loads at the facility;
   (e) electrically coupling each of said plurality of loads at each remote facility to an energy source and electrically decoupling said load from the energy source, in response to the selected channel of information for said load.

9. The load energizing and de-energizing control method of claim 8 wherein:
   (a) said channels of information carried by said transmitted successive signal groups of said generating and transmitting step are time-multiplexed; and
   (b) said generated successive signal groups of said generating step, at each remote facility, are time-multiplexed signals carrying said channels of information.

10. The load energizing and de-energizing control method of claim 9 including the additional step of storing, at each remote facility, successive sets of digital signals representative of said generated successive groups of time-multiplexed signals at the facility.

11. The load energizing and de-energizing control method of claim 10 wherein said selecting step, at each remote facility, includes selecting one bit only from said successive stored signal sets to control the energizing and de-energizing of each of said plurality of loads at the facility.

12. A system for controlling the energizing and de-energizing of energy-utilizing loads at facilities which are geographically remote from each other, comprising:
   (a) a transmitter, geographically remote from each of the facilities, for generating and transmitting successive signal groups carrying a plurality of channels of information for controlling the energizing and de-energizing of a plurality of loads at each of the facilities, each of said signal groups carrying said plurality of channels of information;
   (b) a communication and control terminal at each of the remote facilities adapted for controlling the energizing and de-energizing of said plurality of loads at the facility in response to each of said same successive signal groups at the other of the facilities, including,
       (1) receiving and generating means for receiving each of said transmitted successive signal groups and for generating successive signal groups, carrying said plurality of channels of information, representative of said transmitted successive signal groups, each of said generated signal groups carrying said plurality of channels of information;
       (2) channel-selection means for said plurality of loads at the facility, operatively coupled to said receiving and generating means, for selecting one of said channels carried by said generated successive signal groups to control the energizing and de-energizing of each of said plurality of loads at the facility, and
       (3) switching means for said plurality of loads at the facility, operatively coupled to said selection means and to said plurality of loads, for receiving said channel of information selected for each of said loads and for electrically coupling said load to an energy source and electrically decoupling said load from the energy source, in response to said selected channel of information.

13. A load energizing and de-energizing control system as defined in claim 12 wherein each of said plurality of channels of information which is carried by said transmitted successive signal groups is defined by a different predetermined time interval position in said groups for said channel in a predetermined sequence of time interval positions in said groups for said plurality channels.

14. A load energizing and de-energizing control system as defined in claim 13 wherein each of said plurality of channels of information which is carried by said generated successive signal groups at said remote terminal is defined by a different predetermined time interval position in said generated groups for said channel in a predetermined sequence of time interval positions in said generated groups for said plurality of channels.

15. A load energizing and de-energizing control system as defined in claim 14 wherein said remote terminal includes:
   a shift register for successively receiving said generated successive signal groups at said remote terminal and for successively storing the information in said plurality of channels of information which are carried by said generated successive groups.

16. A method of controlling the energizing and de-energizing of energy-utilized loads at facilities which are geographically remote from each other, comprising the steps of:
   (a) generating and transmitting successive signal groups carrying a plurality of channels of information for controlling the energizing and de-energizing of a plurality of loads at each of the facilities, said generating being at, and said transmitting being from, a location which is geographically remote from each of the facilities, each of said signal groups carrying said plurality of channels of information;
   (b) receiving each of said transmitted successive signal groups at each remote facility;
   (c) generating, at each remote facility, successive signal groups, carrying said plurality of channels of information, representative of said transmitted successive signal groups, each of said generated signal groups carrying said plurality of channels of information;

(d) selecting, at each remote facility, one of said channels of information carried by said generated successive signal groups to control the energizing and de-energizing of each of said plurality of loads at the facility;

(e) electrically coupling each of said plurality of loads at each remote facility to an energy source and electrically decoupling said load from the energy source, in response to the selected channel of information for said load.

17. The load energizing and de-energizing control method of claim 16 wherein each of said plurality of channels of information which is carried by said transmitted successive signal groups is defined by a different predetermined time interval position in said groups for said channel in a predetermined sequence of time interval positions in said groups for said plurality of channels.

18. The load energizing and de-energizing control method of claim 17 wherein each of said plurality of channels of information which is carried by said generated successive signal groups at each remote facility is defined by a different predetermined time interval position in said generated groups for said channel in a predetermined sequence of time interval positions in said generated groups for said plurality of channels.

* * * * *